US011130040B2

(12) United States Patent
Schulte et al.

(10) Patent No.: US 11,130,040 B2
(45) Date of Patent: Sep. 28, 2021

(54) SYSTEM AND METHOD FOR EVALUATING TEAM GAME ACTIVITIES

(71) Applicant: Sportlogiq Inc., Montreal (CA)

(72) Inventors: Oliver Norbert Schulte, Burnaby (CA); Sajjad Gholami, Coquitlam (CA); Zeyu Zhao, Burnaby (CA); Mehrsan Javan Roshtkhari, Montreal (CA); Philippe Desaulniers, Mont-Saint-Hilaire (CA)

(73) Assignee: Sportlogiq Inc., Montreal (CA)

( * ) Notice: Subject to any disclaimer, the term of this patent is extended or adjusted under 35 U.S.C. 154(b) by 0 days.

(21) Appl. No.: 16/198,953

(22) Filed: Nov. 23, 2018

(65) Prior Publication Data

US 2019/0091541 A1    Mar. 28, 2019

Related U.S. Application Data

(63) Continuation of application No. PCT/CA2017/050253, filed on Feb. 27, 2017.

(60) Provisional application No. 62/341,358, filed on May 25, 2016.

(51) Int. Cl.
| | |
|---|---|
| *A63B 71/06* | (2006.01) |
| *H04L 12/00* | (2006.01) |
| *G06Q 10/10* | (2012.01) |
| *H04L 12/46* | (2006.01) |

(52) U.S. Cl.
CPC ............ *A63B 71/06* (2013.01); *G06Q 10/10* (2013.01); *H04L 12/00* (2013.01); *H04L 12/4625* (2013.01)

(58) Field of Classification Search
CPC .................. A63F 13/46; A63F 13/795; A63F 2300/5566; A63F 2300/558; G09B 19/0038
See application file for complete search history.

(56) References Cited

U.S. PATENT DOCUMENTS

| | | |
|---|---|---|
| 2009/0325709 A1 | 12/2009 | Shi |
| 2012/0142429 A1 | 6/2012 | Muller |
| 2012/0283007 A1 | 11/2012 | Sanders |
| 2014/0330734 A1 | 11/2014 | Sung et al. |

OTHER PUBLICATIONS

International Search Reporting issued in corresponding PCT application No. PCT/CA2017/050253; search completed Jun. 7, 2017.
Supplementary Search Report from European Application No. 17801858.6; search completed Sep. 23, 2019.

(Continued)

*Primary Examiner* — Lawrence S Galka
(74) *Attorney, Agent, or Firm* — CPST Intellectual Property Inc.; Brett J. Slaney

(57) ABSTRACT

A system and method are provided for creating and evaluating computational models for games (e.g., individual or team sports games, etc.), team performance, and individual player performance evaluation. The method comprises obtaining data associated with the team game, the information comprising at least one individual player activity, at least one team activity, at least one game event, and a location in space and time for each of the events and activities; generating quantitative values for the data associated with the team game; and evaluating either or both an individual player and a team using the quantitative values.

21 Claims, 10 Drawing Sheets

(56) References Cited

OTHER PUBLICATIONS

Routley, Kurt et al.: "A Markov Game model for valuing actions, locations, and team performance in ice hockey", Journal of Data Mining and Knowledge Discovery, Dec. 1, 2015 (Dec. 1, 2015), XP055441142, ISSN: 1384-5810.
Kon, H et al.: "Players Clustering Based On Graph Theory for Tactics Analysis Purpose in Soccer Videos", IEICE Transactions on Fundamentals of Electronics, Communications and ComputerSciences, Engineering Sciences Society, Tokyo, JP, vol. E90A, No. 8, Aug. 1, 2007 (Aug. 1, 2007), pp. 1528-1533, XP001506564, ISSN: 0916-8508, DOI: 10.1093/IETFEC/E90-A. 8.1528.
Leo, Marco et al.: "A multi camera system for soccer player performance evaluation", Distributed Smart Cameras, 2009. ICDSC 2009. Third ACM/IEEE International Conference on, IEEE, Piscataway, NJ, USA, Aug. 30, 2009 (Aug. 30, 2009), pp. 1-8, XP031548044, ISBN: 978-1-4244-4620-9.
Skinner, B. et al., "A Method for Using Player Tracking Data in Basketball to Learn Player Skills and Predict Team Performance". PLOS ONE, Sep. 9, 2015 (Sep. 9, 2015), pp. 1-15, [online] [retrieved on Jun. 6, 2017 (Jun. 6, 2017)]. Retrieved from the Internet: <http://jountals.plos.org/plosone/article/file?id=10.1371/journal.pone.0136393&type=printable>.
MacDonald, Brian: An Improved Adjusted Plus-Minus Statistic for NHL Players. 2011. URL http://www.sloansportsconference.com/wp-content/uploads/2011/08/An-Improved-Adjusted-Plus-Minus-Statistic-for-NHL-Players.pdf.
Cervone, D. et al.: "Pointwise: Predicting points and valuing decisions in real time with NBA optical tracking data", 8th Annual MIT Sloan Sports Analytics Conference, Feb. 2014.
Gramacy, R.B. et al.: "Estimating player contribution in hockey with regularzed logistic regression.", Journal of Quantitative Analysis in Sports, pp. 97-111, 2013.
Littman, Michael L.: "Markov games as a framework for multi-agent reinforcement learning", Proceedings of the eleventh international conference on machine learning, pp. 157-163, 1994.
Lock, D. et al.: Beyond +/−: A rating system to compare NHL players.. 2009. Presentation at joint statistical meetings.
Schukers, M. et al.: "Total Hockey Rating (THoR): A comprehensive statistical rating of National Hockey League forwards and defensemen based upon all on-ice events", 7th Annual MIT Sloan Sports Analytics Conference, 2013.
Pettigrew, S.: "Assessing the offensive productivity of NHL players using in-game win probabilities", 9th Annual MIT Sloan Sports Analytics Conference, 2015.
Schumaker, Robert P. et al.: Research in Sports Statistics in Sports Data Mining. Springer US, 2010. URL http://dx.doi.org/10.1007/978-1-4419-6730-5_4.
Routley, Kurt et al.: (2015), A Markov Game Model for Valuing Player Actions in Ice Hockey, in Uncertainty in Artificial Intelligence (UAI), pp. 782-791.
Spagnola, N.: The Complete Plus-Minus: A Case Study of The Columbus Blue Jackets. 2013.
Thomas, A.C. et al.: "Competing Process Hazard Function Models for Player Ratings in Ice Hockey", The Annals of Applied Statistics, pp. 1497-1524, 2013.
Frey, B. J. et al.; (2007), 'Clustering by passing messages' Frey, B. J. & Dueck, D. (2007), Science 315(5814), 972-976.

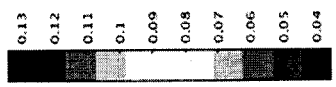
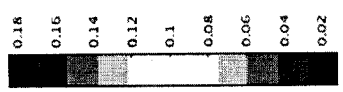
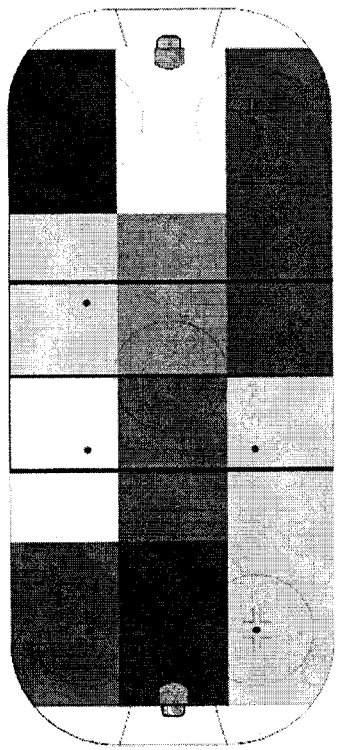
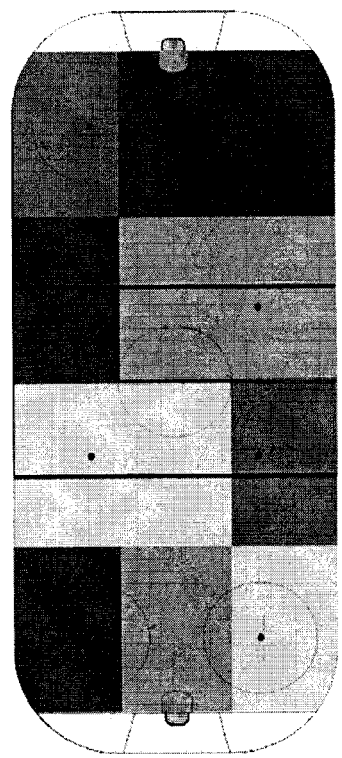
FIG. 5B
FIG. 6B
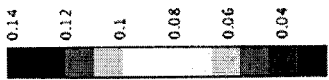
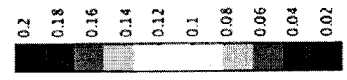
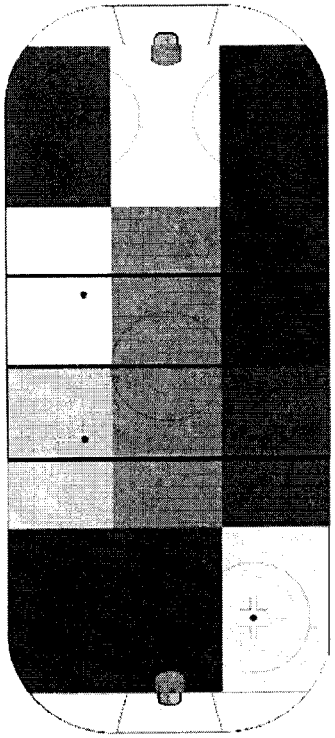
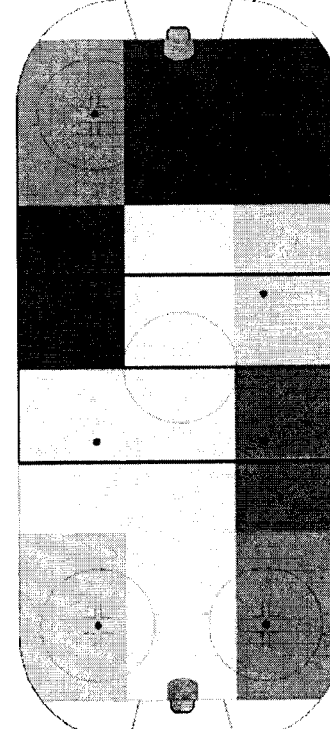
FIG. 5A
FIG. 6A

SYSTEM AND METHOD FOR EVALUATING TEAM GAME ACTIVITIES

CROSS-REFERENCE TO RELATED APPLICATION(S)

This application is a continuation of PCT Application No. PCT/CA2017/050253 filed on Feb. 27, 2017, which claims priority to U.S. Provisional Patent Application No. 62/341,358 filed on May 25, 2016, both incorporated herein by reference.

TECHNICAL FIELD

The following relates to systems and methods for evaluating players and team game activities.

DESCRIPTION OF THE RELATED ART

An important objective in the field of sports statistics is to understand which actions contribute to winning in what situation. Since sports statistics have begun entering the field of "big data", there are increasing opportunities for large-scale machine learning to model complex sports dynamics. Existing techniques that rely on Markov Game models typically aim to compute optimal strategies or policies [14] (e.g., minimax or equilibrium strategies).

One of the main tasks for sports statistics is evaluating the performance of teams and players [20]. A common approach is to assign action values, and sum the corresponding values each time a player takes the respective action. A simple and widely used example in ice hockey is the "+/−score": for each goal scored by (against) a player's team when he/she is on the ice, add +1 (subtract −1) point. Researchers have developed several extensions of "+/−score" for hockey [2, 22, 16]. The National Hockey League has also begun publishing advanced player statistics such as the Corsi (shot attempts) and Fenwick (unblocked shot attempts) ratings.

There exist several methods that aim to improve the basic "+/−score" with statistical techniques [2, 7, 22]. A common approach is to use regression techniques where an indicator variable for each player is used as a regressor for a goal-related quantity (e.g., log-odds of a goal for the player's team vs. the opposing team). The regression weight measures the extent to which the presence of a player contributes to goals for his/her team or prevents goals for the other team. However, these approaches are found to consider only goals, without considering other actions.

An alternative game model, the Total Hockey Rating (THoR) [16], assigns a value to all actions, not only goals. Actions are evaluated based on whether or not a goal occurred in the following 20 seconds after an action. For penalties, the duration of the penalty was used as the look ahead window. The THoR assumes a fixed value for every action and does not account for the context in which an action takes place. Furthermore, the 20 second window restricts the look ahead value of each action.

Markov Decision Process (MDP)-type models have been applied in a number of sports settings, such as baseball, soccer and football [3]. For example, in reference [3] spatial-temporal tracking data for basketball are used to build the "Pointwise" model for valuing player decisions and player actions.

In general, it has been found that MDP-type models have been limited to the use of temporal order of the game states in a discrete space. That is, the MDP is typically used in its conventional way, i.e., identifying an optimal policy for a critical situation in a sport or game. In addition, those models are found to be limited to a small number of states and actions (a low dimensional space) [21].

Moreover, player comparison and ranking is considered a very difficult task that requires deep domain knowledge. The difficulty is not only in defining appropriate key metrics for players, but also in finding a group of players who have similar playing styles. From the scouting perspective, a scout would need to watch multiple games of a player to come up with a conclusion about the skills and style of a young talent. However, it is not possible for the scouts to watch all the games from all the leagues around the world, making it difficult to rely on scouting reports to obtain the knowledge required to properly compare and rank players.

SUMMARY

The following relates to a system and method for creating and evaluating computational models for games (e.g., team or individual sports games, etc.), team performance, and individual player performance evaluation in such games.

In one aspect, there is provided a method for evaluating a team game, the method comprising obtaining data associated with the team game, the information comprising at least one individual player activity, at least one team activity, at least one game event, and a location in space and time for each of the events and activities; generating quantitative values for the data associated with the team game; and evaluating either or both an individual player and a team using the quantitative values.

In another aspect, there is provided a method for grouping players in a game based on a respective playing style, the method comprising: obtaining data associated with the game, the information comprising at least one individual player or team activity, and at least one game event; and automatically generating a plurality of clusters of one or more players based on a presence and/or activities associated with each player.

The clusters can be generated by: obtaining information about a player's presence; generating a presence map for the players; grouping presence maps based on similarity in spatial and/or temporal characteristics; and forming the clusters.

In other aspects, there are provided computer readable media and electronic devices and/or systems for performing the above methods.

BRIEF DESCRIPTION OF THE DRAWINGS

Embodiments will now be described by way of example only with reference to the appended drawings wherein:

FIG. 5A is an example activity heat map for Player A;

FIG. 5B is an example activity heat map for Player A's cluster;

FIG. 6A is an example activity heat map for Player B;

FIG. 6B is an example activity heat map for Player B's cluster;

DETAILED DESCRIPTION

Figure 1A:
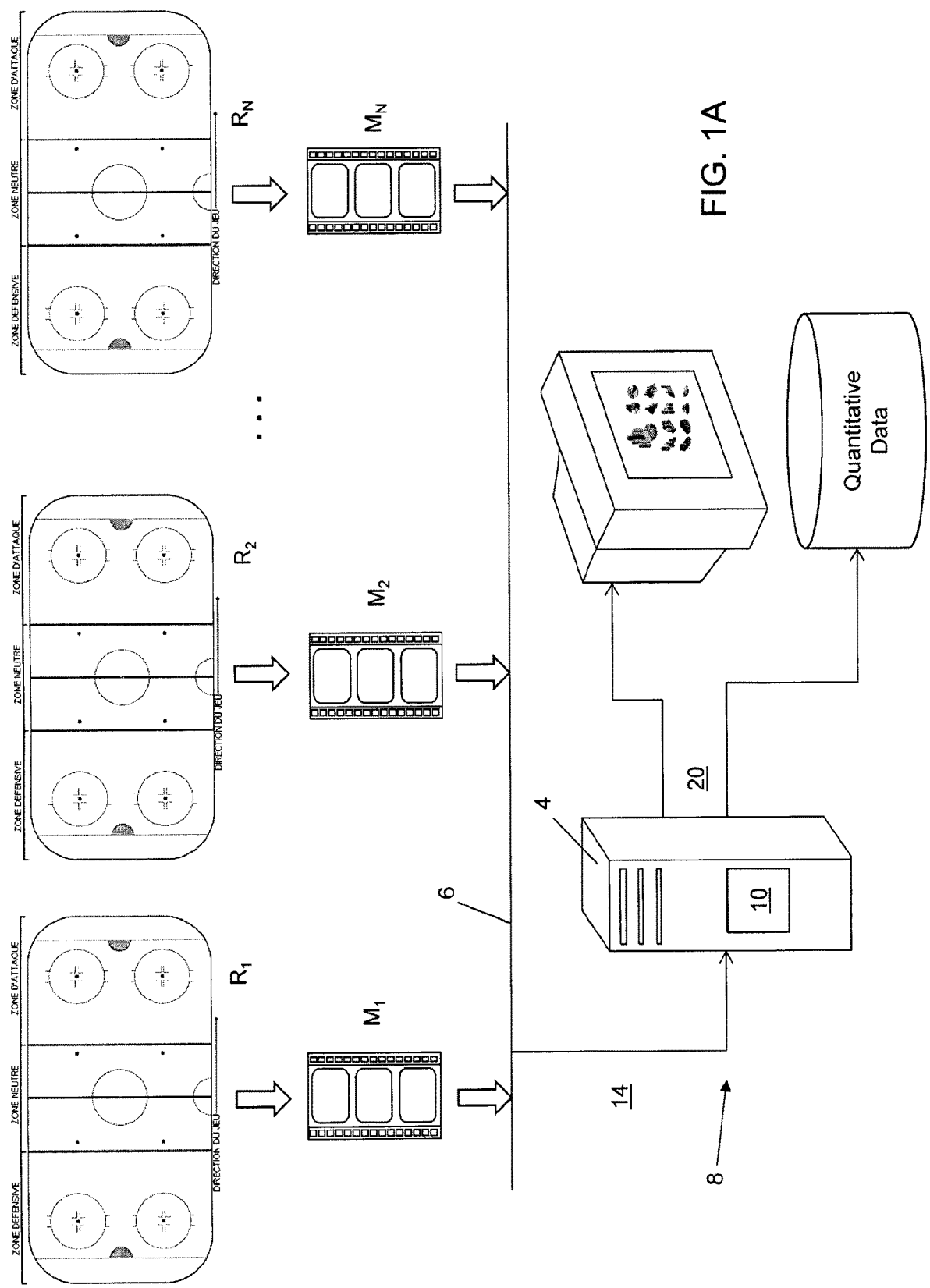
FIG. 1A is a schematic block diagram of a system for obtaining data and building and evaluating a game model.

The following provides a method that uses a context-aware approach to value player actions, locations, and individual or team performance in games, particularly for sports games and matches. The developed models can use machine learning and artificial intelligence (AI) techniques to incorporate context and look-ahead metrics. Team performance can be assessed as the aggregate value of actions by the team's players. Model validation shows that the total team action value provides a strong indicator or predictor of team success. Although the following examples are directed to ice-hockey, the principles described herein can also be used for any other games in which there exists a set of meaningful events and actions in a defined space, resulting in a measurable outcome such as a goal or score.

The following applies such AI techniques to model the dynamics of team sports, for example using the Markov Game Model formalism described in reference [14], and related computational techniques such as a dynamic programming value iteration algorithm. In this way, the system described herein develops and relies on models that learn how a game is actually played, and optimal strategies can be considered as implicit natural outcomes of the learnt models.

It has been found that the methods that are only context regressor-based only take into account which players are on the ice when a goal is scored. As shown below, such regression-based methods can also be combined with the Markov Game Model as herein described, to capture how team impact scores depend on the presence or absence of individual players.

In contrast to previous techniques, the presently described Markov Game-based learning method is not restricted to any particular time window for a look ahead.

Also, the system described herein in part proposes a context-aware model. As an example, a goal (an action) is typically considered to be more valuable in a tied-game situation than when the scorer's team is already four goals ahead [18]. Richer state spaces therefore capture more of the context of an action. In addition, previously reported methods compute action scores based on immediate positive consequences of an action (e.g. goals following a shot). However, an action may have medium-term and/or ripple effects rather than immediate consequences in terms of visible rewards like goals. Therefore evaluating the impact of an action requires look ahead. Long-term look ahead can be particularly important in ice hockey because evident rewards-like goals occur infrequently [15]. For example, if a player receives a penalty, this leads to a manpower disadvantage for his/her team, known as a powerplay for the other team. It may be considered easier to score a goal during a powerplay, but this does not mean that a goal will be scored immediately after the penalty is assessed (or at all). The dynamic programming value iteration algorithm of Markov Decision Processes provides a computationally efficient way to perform unbounded look ahead.

The systems and methods described herein therefore use game context and locations associated with game events in order to learn the value of each action and event executed by players of the game. The learned game model provides information about the likely consequences of actions. The basic model and algorithms can also be adapted to study different outcomes of interest, such as goals and penalties. In addition, the model can be used for team performance evaluation, team performance prediction, game outcome prediction, and grouping players based on a playing style. In addition, players can be ranked within groups of similar players based the values of their activities throughout a game.

It has also been recognized that player comparison and ranking is a very difficult task that requires deep domain knowledge. The difficulty is not only in defining appropriate key metrics for players, but also in finding a group of players who have similar playing styles. Following forming the groups of similar players, game models and performance metrics can be applied to assess players' skills.

The systems and methods described herein also use the location pattern of the players, i.e., where they tend to be present or play (or where they take their actions) in a game. Clusters can be formed using machine learning techniques which take into account the location information, however the prior information about players' roles and styles can be added to the models to generate more refined clusters.

An exemplary embodiment focuses on measuring how much a player's actions contribute to the outcome of the game at a given location and time. This can be performed by assigning a value to each action depending on where and when the action takes place using a Markov decision process model. Once the values for the actions and game events are assigned, players can be ranked according to the aggregate value of their actions, and compared to others in their cluster. In this study, the value of a player's action is measured as its impact on his team's chance of "scoring the next goal"; the resulting player metric is called his or her Scoring Impact (SI). The "scoring the next goal" metric can be chosen as the end goal of a sequence of game events because it can be clearly defined as a measurable objective for a team. However, the developed model is not necessarily dependent on this outcome and any other event can be used as the end state of the Markov process, for example shots (from a certain location) in a hockey game, passes, or any possible player activity in a game.

Learned Game Model and System Configuration

Turning now to the figures, FIG. 1A illustrates an example of a system 8 that can gather or receive, and utilize media data such as video, images, audio clips, sensory data about player locations, body pose, actions, etc. (e.g., $M_1$, $M_2$, etc. shown in this example) from any number of game-play locations (e.g., rinks $R_1$, $R_2$, etc. shown in this example) to enable a computing system 4 to model game play and game events using a game model 10, in order to generate quantitative data outputs and/or to display such data outputs.

Figure 1B:
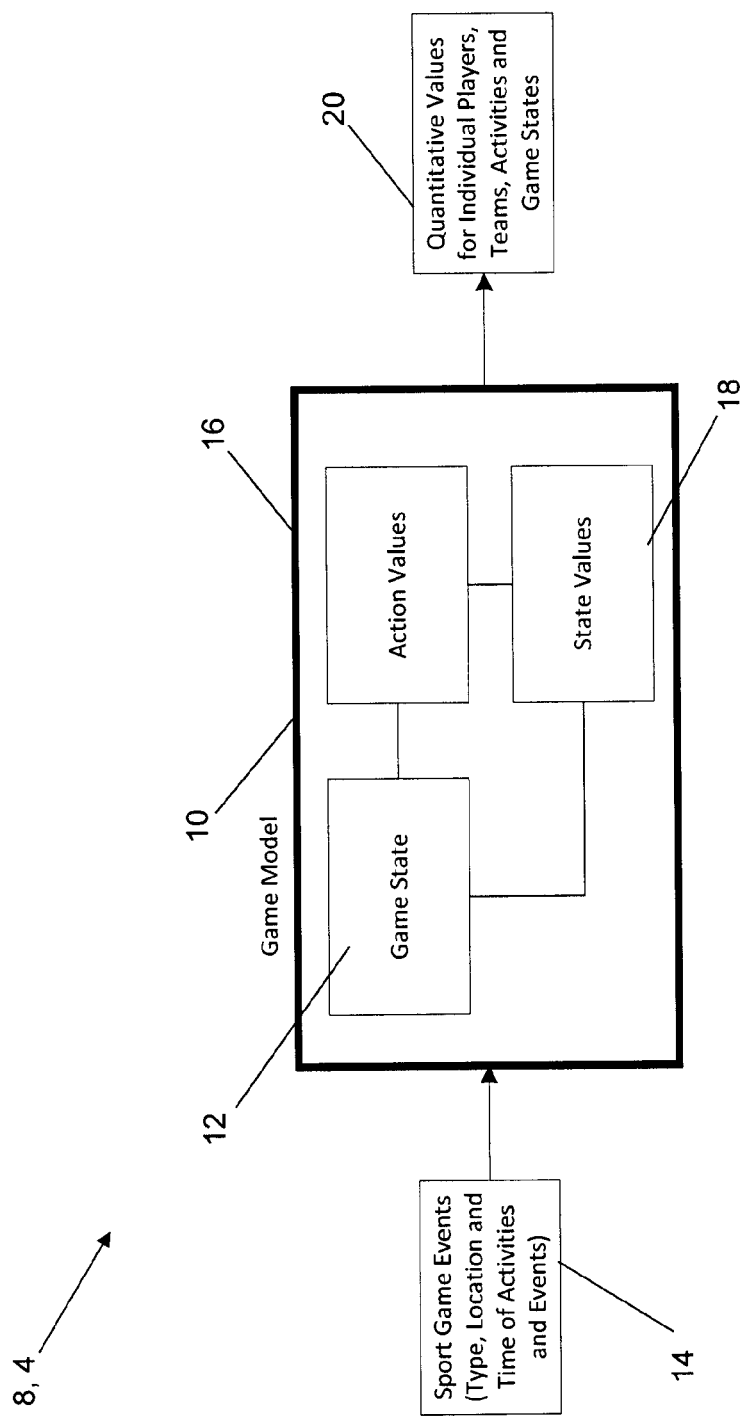
FIG. 1B is a schematic block diagram of a system for evaluating a game using information about the game situation and by building and using a game model.

FIG. 1B is a schematic block diagram of the system 8 that builds and uses a game model 10 for team sports, and which illustrates the general flow of information through the process described herein. As illustrated above, the system 8 can include any combination of software, hardware, firmware, etc.; and programs the model 10 into software program. The system 8 receives information 14 about the current game situation, individual and/or group activities and events along with location and their temporal order and generates an output 20 that provides the quantitative values enabling one to determine what has been learned by the model. Game states and actions are evaluated using the quantitative values 12, 16, and 18 as will be explained in greater detail below.

Figure 2:
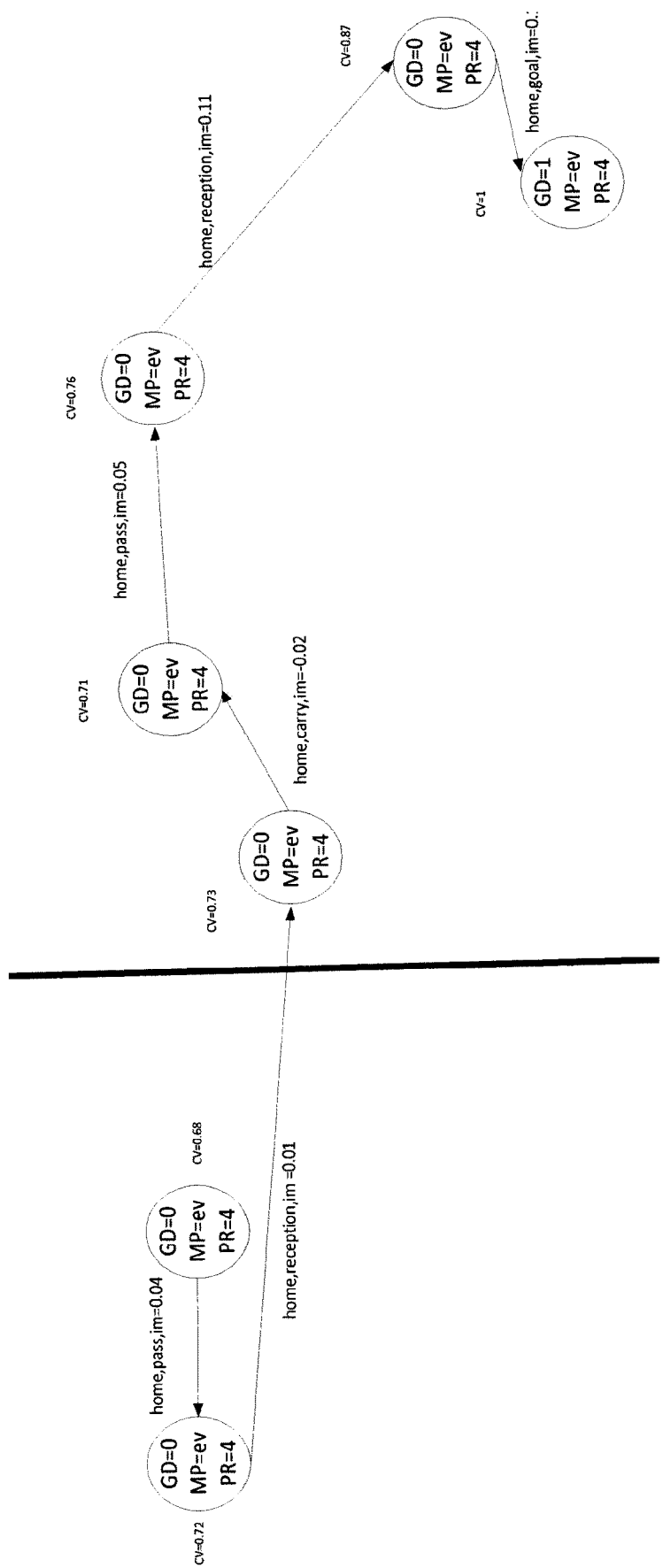
FIG. 2 is a schematic diagram illustrating a high-value trajectory for a successful play in a sports game.
Figure 3:
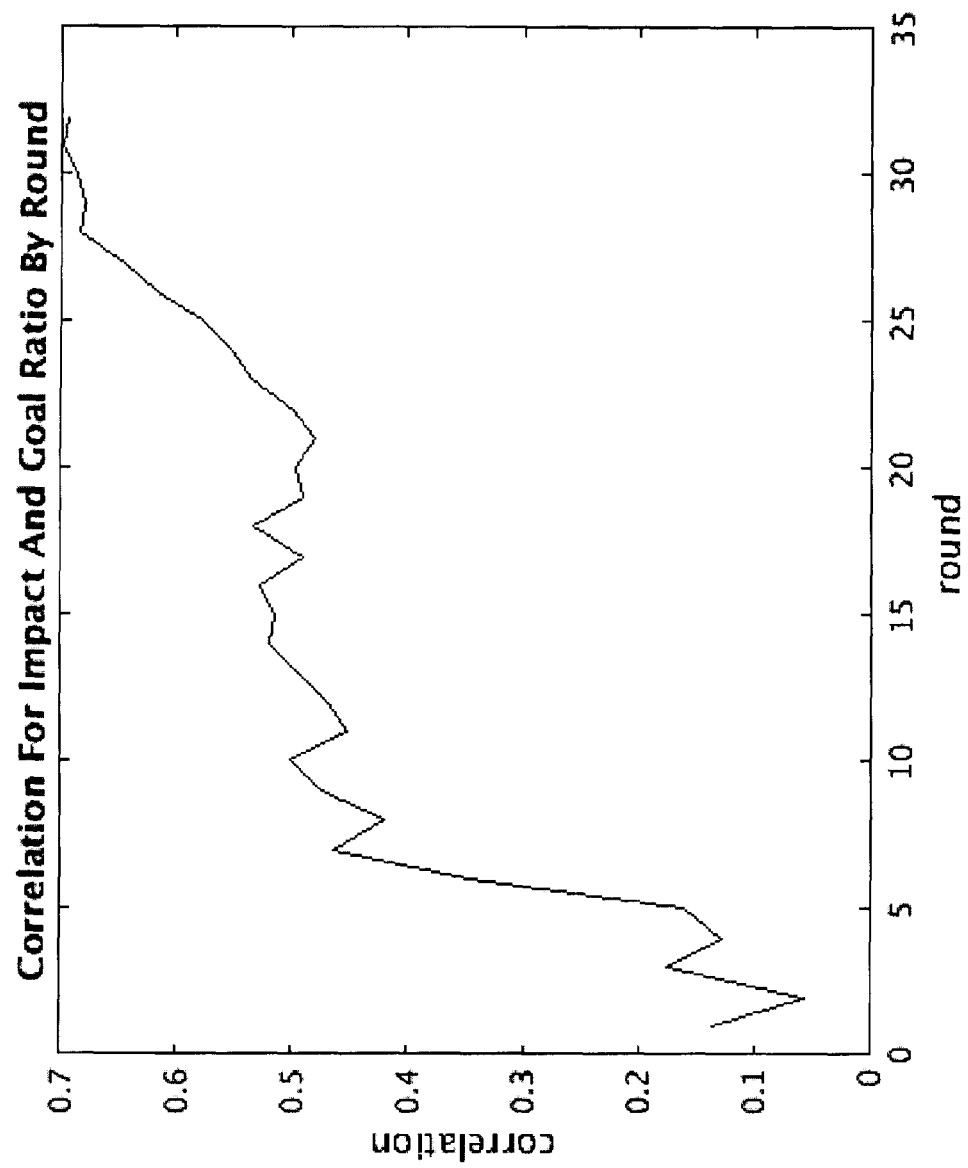
FIG. 3 is a graph depicting a correlation between a goal ratio and team impact.

FIG. 2 demonstrates a high-value trajectory that represents one generic successful play by a home team. In this example, the play takes place in the top half of an ice rink during an ice hockey game, and location coordinates are rescaled to bring nodes closer together. The nodes are labelled with the conditional values of a state for the home team, e.g., the probability that the home team scores the next goal, as described below. Edges are labelled with actions, and with the impact of the action, which is the difference in conditional probabilities. FIG. 3, also described in greater detail below, is a graph showing the correlation between a "Goal Ratio" (averaged over all matches in this example) and "Team Impact" (averaged over the first k matches in this example).

The following relates to methods and systems for developing a game model that considers both space and time components of player locations and their actions and game events. The exemplary implementation described herein develops game models for ice-hockey and certain aspects are directed to a specific sport. This exemplary embodiment uses Markov Models to formalize the ice hockey game and compute the values of states and actions during a game. The following also provides examples of how individual player actions can be evaluated and how performance of teams can be measured.

A Markov Game [14], sometimes referred to as a stochastic game, is defined by a set of states, S, and a collection of action sets, A, one for each agent in the environment. State transitions are controlled by the current state and a list of actions, one action from each agent. For each agent, there is an associated reward function mapping a state transition to a reward. An overview of how the presently described Markov Game model fills in this schema is as follows.

There are two teams, which are referred to herein as the Home Team, H, and the Away Team, A. In each state, only one team performs an action, although not in a turn-based sequence. This reflects the way the data record actions. Thus at each state of the Markov Game, exactly one player from one team can perform the action and the other players from the other team chooses No-operation, which implies that either they do nothing or their activity is not in the action space, A. The following generic notation for all states is provided, based in part on references [23, 14].

Occ(s,a) is the number of times that action a occurs in state s as observed in the play-by-play data.

Occ(s,a,s') is the number of occurrences of action a in state s being immediately followed by state s' as observed in the play-by-play data. (s,s') forms an edge with label a in the transition graph of the Markov Game model.

The transition probability function TP is a mapping of $S \times A \times S \rightarrow (0,1]$.

It is estimated using the observed transition frequency $$\frac{Occ(s, a, s')}{Occ(s, a)}$$

One can begin by defining the state space, S and then the action space, A. State space, S, in a sport game is normally defined in terms of hand-selected features that are intuitively relevant for the game dynamics, such as the goal differential and penalties in ice hockey, which are referred to as context features. An exemplary state space for ice-hockey may contain:

Goal Differential (GD), which is calculated as Number of Home Goals–Number of Away Goals; and Manpower Differential (MD), which specifies whether the teams are at even strength (EV), the acting team is short-handed (SH) or in a powerplay (PP), etc.

Figure 8A:
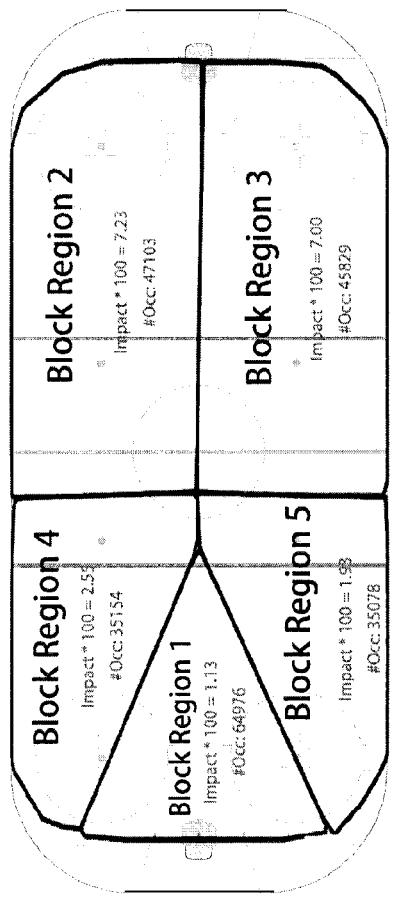
FIG. 8A is an overlay of an ice rink showing learned regions for "block" events.
Figure 9:
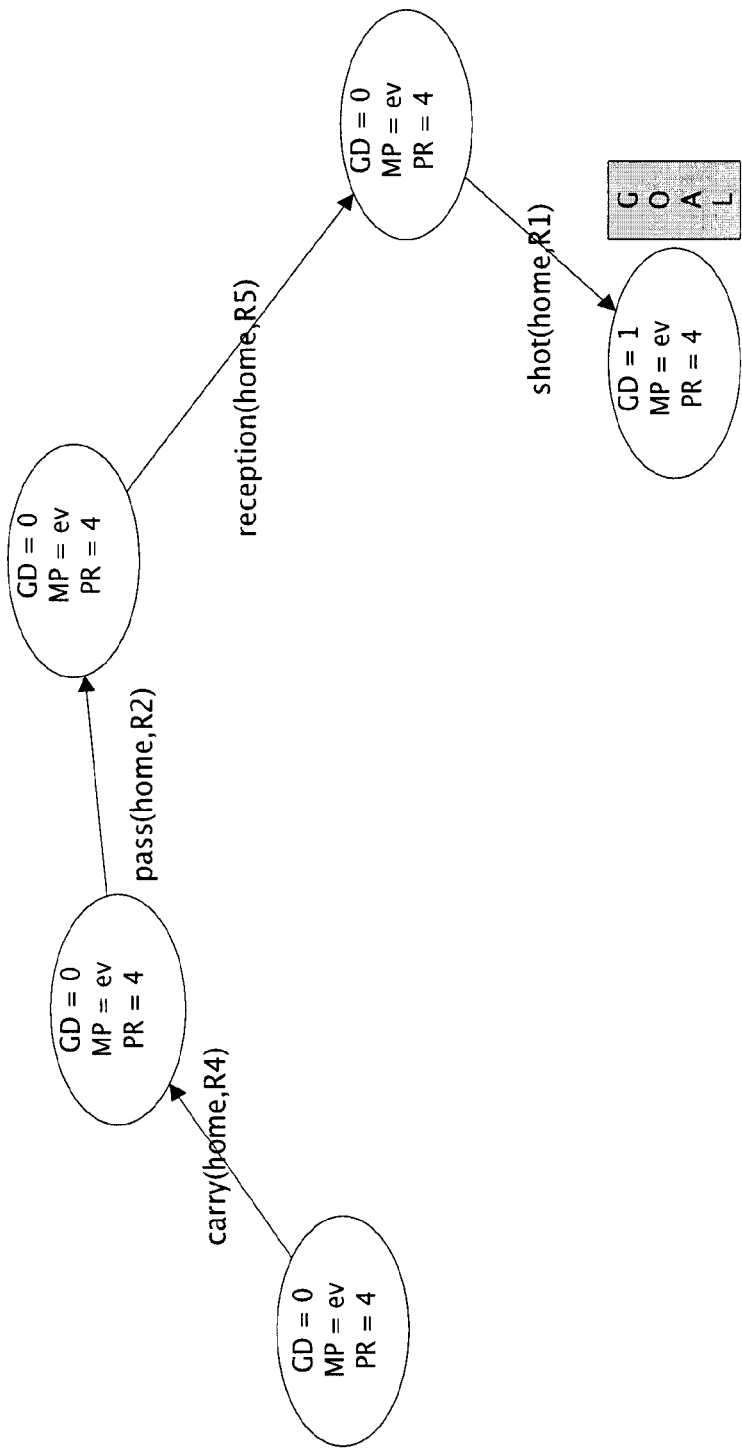
FIG. 9 is an example of a state action trajectory according to a Markov game model.

The action space, A, can be a multi-dimensional space coding the type of players' actions, information about their team, location of that action in space, and the time that an action happens. For instance, block(home,region3) denotes the action that the home team blocks the puck in the block-region 3 (see FIG. 8A). FIG. 9 shows a possible state-action trajectory, which Table 1 below describes in play-by-play format.

TABLE 1

State-Action Trajectory in Play-by-Play Format

| | State Variables | | | Action Parameters | | | Quantities derived from Model | | |
|---|---|---|---|---|---|---|---|---|---|
| Event | Goal Differential | ManPower Differential | Period | Team | Action Type | Region | Transition Probability | Conditional Value (Home) | Impact |
| 0 | 0 | Even | 4 | Home | Carry | 4 | — | 73% | — |
| 1 | 0 | Even | 4 | Home | Pass | 2 | 21% | 71% | −2% |
| 2 | 0 | Even | 4 | Home | Reception | 5 | 3% | 76% | 5% |
| 3 | 0 | Even | 4 | Home | Shot | 1 | 34% | 86% | 10% |

Previous research on Markov process models related to ice hockey has used only context features. A Markov process model can answer questions such as how goal scoring or penalty rates depend on the game context [24]. However, the presently described system also focuses on the impact of a player's actions on a game. One can next introduce the action space for the Markov model.

A strength of Markov Game modelling is value iteration, which can be applied to many reward functions depending on what results are of interest. This exemplary embodiment focuses on goal scoring, specifically scoring the next goal. This choice produces an interpretable value function: the value of a state for a team is the chance that the team scores the next goal.

The next goal objective can be represented in the Markov Game model as follows.

For any state $s \in S$ where a Home team scores a goal, one can set: $R_H(s,a):=1$. Similarly, when a goal is scored for the Away team: $R_A(s,a):=1$. For other states the reward is equal to 0. The reward differential is defined by:

$$R(s,a):=R_H(s,a)-R_A(s,a).$$

After a goal is scored, the next state is an absorbing state (no transitions from this state).

With these definitions, the expected reward represents the probability that if play starts in a state S, a random walk through the state space of unbounded length ends with a goal for either the Home or the Away team. The reward differential is the difference in these probabilities. It is consistent with the practice in zero-sum game theory of assigning a single value to a game outcome: +1 for the maximizer, −1 for the minimizer, 0 for a tie [23].

In order to encode the location information in a computationally efficient way, the continuous location space can be discretized into a discrete set. The disadvantage of this approach is that it can lose some information about the exact location of an action event. The computational advantage is that algorithms for discrete Markov models can be employed. The statistical advantage is that discretization requires neither parametric assumptions (e.g. Gaussian or Poisson distribution), nor stationarity assumptions that treat different locations as the same. To minimize the loss of information, the discrete location bins can be learned by clustering occurrences of each action type. There is therefore a separate clustering for each action type. Learning the clusters has the advantage over a fixed discretization that clusters are allocated to areas of high density; some action types occur very rarely in some parts of the ice hockey rink. However, the system described herein is not limited to the use of a specific discretization technique and continuous locations can be used to build the game model.

Recall that the value of a state, V(s), is the expected reward when the game starts in state S. If each state appeared at most once between goals, one could compute the goal value function for, say the home team, simply as follows: count the number of state occurrences that were followed by a home goal, and divide by the total number of all state occurrences.

However, a state may appear any number of times between goals. That is, the transition graph may contain loops. In that case the value function can be computed by an iterative procedure known as value iteration. It may be observed that any value function satisfies the Bellman equation:

$$V(s) = \sum_{s',a} P(s, a, s') \times V(s')$$

Value iteration starts from an initial value assignment—typically 0 for each state—then applies the Bellman equation as an update equation. One can use an undiscounted value function for the value iteration. In the hockey domain, one can run value iterations for each of the three reward functions $R_H$, $R_A$, R and stop the iteration when the value difference stops changing (i.e. when the value function for R converges). In the experimental evaluation a relative convergence of 1% was used as the convergence criterion. With this convergence criterion, value iteration converges within 14 steps. This means that looking ahead more than 14 steps changes the estimate of the goal scoring differential between Home and Away by less than 1%.

Given the learned models of the game, the following provides experimental examples of how the model evaluates sport player actions in context. This illustrates some results for the hockey domain.

As an exemplary application, the model can be used for a planning task, to find successor states that are most likely to lead to a goal. FIG. 2 shows a high-value trajectory where a state is connected to its highest value successor (for the Home team). The play takes place in the top half of the rink. Location coordinates are rescaled to bring nodes closer. Nodes are labelled with the conditional values of a state for the home team, i.e., probability that the home team scores the next goal. Edges are labelled with actions, and with the impact of the action, which is the difference in conditional probabilities.

One can evaluate an action in a context-aware way by considering its expected reward after executing it in a given state. This is known in reinforcement learning as the Q-value [19]:

$$Q(s, a) = \sum_{s'} P(s, a, s') \times R(s, a).$$

The following also considers a conditional Q-value. The conditional Q-value for the home team is the Q-value for the home team performing an action, divided by the sum of the Q-value for the home team and the Q-value for the away team (and similarly for the away team). The conditional Q-value corresponds to conditioning on the event that at least one of the teams scores a goal within the next 14 time steps (a look ahead horizon). It measures the expected reward of a team relative to its opponents, in other words, the advantage that a team enjoys over its opponent in a given match state. For example, with reward=scoring the next goal, a conditional Q-value of p for the home team means that, given that one of the teams will score the next goal within the next 14 time steps, the chance is p that the home team manages the next goal.

The model can be used to evaluate team performance. The general idea is that team strength can be estimated as an aggregate of individual action values, and then correlated with ground truth metrics such as numbers of goals scored. For example, an Expected Goal metric scores each shot according to its chance of leading to a goal (immediately). The sum of goal probabilities for each shot is the team's Expected Goal metric. The Expected Goal metric is a special case of the value function, where look ahead is equal to one and the only action type taken into consideration is a shot. Consequently, the goal impact metric and more generally, the impact of an action can be defined as:

$$\text{impact}(s,a) = Q(s,a) - V(s)$$

When the reward function is defined by scoring the next goal, the goal impact measures how much a player's action changes the chance that his/her team scores the next goal, given the current state of the match. The team goal impact in a game is the sum of goal impacts over all actions in the match by the players of a team. One can examine correlations between the Average Goal Ratio, Average Team Impact, Average Team Impact with Lookahead=1, Average Team Impact without location, and Average Team Value Difference with Lookahead=1 which are defined as follows:

Average Goal Ratio is defined as the number of the goals by the team divided by the total number of goals by either side. For each team, we compute the average goal ratio over all games.

Average Team Impact is the average goal impact for a team, over all the games.

Average Team Impact with Lookahead=1 is the average team impact using a value function with lookahead=1 step (rather than 14).

Average Team Impact without Location is the average team impact where all locations are treated the same.

Average Team Value Difference with Lookahead=1 is the sum of action values, Q(s,a), for each action taken by the team in a game, minus the sum of action values taken by their opponent in the same game. With lookahead=1, the action value sums are dominated by probability of a shot being successful, which is the basis of the Expected Goals Ratio metric.

Table 2 below shows the correlation coefficients $\rho$ between Goal Ratio and the Impact metrics. The full team impact metric shows an impressive correlation of 0.7. Reducing the look ahead to only 1 step can significantly reduce the information that the impact metric provides about a team's result, down to a mere 0.09 correlation. Without the location information, the impact metric still gives meaningful results, but is much less informative with a correlation of 0.21. The value difference is in fact more informative with single-step lookahead, at a correlation of 0.34. Overall, it can be seen that the full team impact metric manages to extract by far the most information relevant to predicting a team's performance.

TABLE 2

Correlations Between Team Impact in the Full Model vs. Restricted Models. The range of the correlation coefficient is [−1, +1]

| Metric M | Average Team Impact | Average Team Impact with Lookahead = 1 | Average Team Impact without Location Information | Average Team Value Difference with Lookahead = 1 |
|---|---|---|---|---|
| $\rho$ (M, GoalRatio) | 0.70 | 0.09 | 0.21 | 0.34 |

The correlation between goal ratio and the Team Impact in a single game was also computed and the correlation was found to be $\rho$=0.45. This correlation coefficient indicates that the impact values carry substantial information about the outcome of a game.

Correlations computed not from the entire dataset, but from initial observations were also considered. FIG. 3 illustrates the correlation coefficients between the final Goal Ratio, averaged over all matches, and a moving average of the Team Impact Total, averaged over the first k matches. The correlation is close to 0.5 after 10 matches, which is less than half the number of total matches for all teams in the dataset that was used. This means that after a relatively small number of observed matches, the Average Team Impact carries substantive information about the final Goal Ratio performance of a team.

Location-Based Player Clustering and Ranking

In the following, location information is used to first generate clusters of players who are similar and then compute a Scoring Impact (SI) metric based on the players' actions at different locations. The rationale behind clustering players before ranking them is intuitive, for example, since typically a defenseman is not compared directly to a forward. In the following examples, a forward is compared to a forward while a defenseman should be compared to a defenseman. Although comparing players in the same position may be considered trivial for anyone who knows the game, building a purely data-driven approach to generate clusters of players without using any prior information has been found to pose challenges. To build the player clusters, the following uses the location pattern of the players, i.e., where they tend to play. This generates clusters in an unsupervised fashion, which results in groups of players with similar styles and roles.

Once the clusters are formed, any metric can be developed to rank the players and evaluate their impact on the game outcome. The following focuses on measuring how much a player's actions contribute to the outcome of the game at a given location and time. This is performed by assigning a value to each action depending on where and when the action takes place using a Markov decision process model. For example, the value of a pass depends on where it is taken and it has to be rewarded if it ends up in maintaining the puck possession. Once the values for the actions and game events are assigned, players can be ranked according to the aggregate value of their actions, and compared to others in their cluster. In a study that has been conducted, the value of a player's action is measured as its impact on his team's chance of scoring the next goal; the resulting player metric is called his Scoring Impact (SI) as noted above.

The experimental results indicate that the SI correlates with plausible alternative metrics such as a player's total points and salary. However, SI suggests some improvements over those metrics as it captures more information about the game events. The results can be illustrated by identifying players that highly impact their team scoring chances, yet draw a low salary compared to others in their cluster.

For the system 8, player clustering can be performed by using the affinity propagation algorithm [25]. This algorithm groups players by clustering heat maps that represent their location patterns. To compute the probability that a team scores the next goal given the current state of the game, a Markov Decision Process is developed to model hockey games. As opposed to approaches for player performance assessment that are based on using aggregate action counts as features, the presently described model-based method has several advantages, including:

Capturing the game context: the states in the model capture the context of actions in a game. For example, a goal is more valuable in a tied-game situation than when the scorer's team is already four goals ahead.

Look-ahead and medium-term values: modeling game trajectories provides a look-ahead to the medium-term consequences of an action. Looking ahead to the medium-term consequences allows one to assign a value to every action. This is particularly important in continuous-flow games like hockey because evident rewards like goals occur infrequently. For example, if a player receives a penalty, the likelihood increases that the opposing team will score a goal during the power play at some point, but this does not mean that they will score immediately.

Player and team impact: The aggregate impact of a player can be broken down into his average impact at specific game states. Since game states include a high-level of context detail, the model can be used to find the game situations in which a player's decisions carry especially high or low values, compared to other players in his cluster. This kind of drill-down analysis explains, and goes beyond, a player's overall ranking. The following provides what has been discovered to be the first examples of drill-down analysis for two players (Players A and B, based on real-life players).

It can be appreciated that while the present examples focus on players, the same approach can be used to cluster and analyze the performance of lines and teams.

Hockey Dataset

Figure 4:
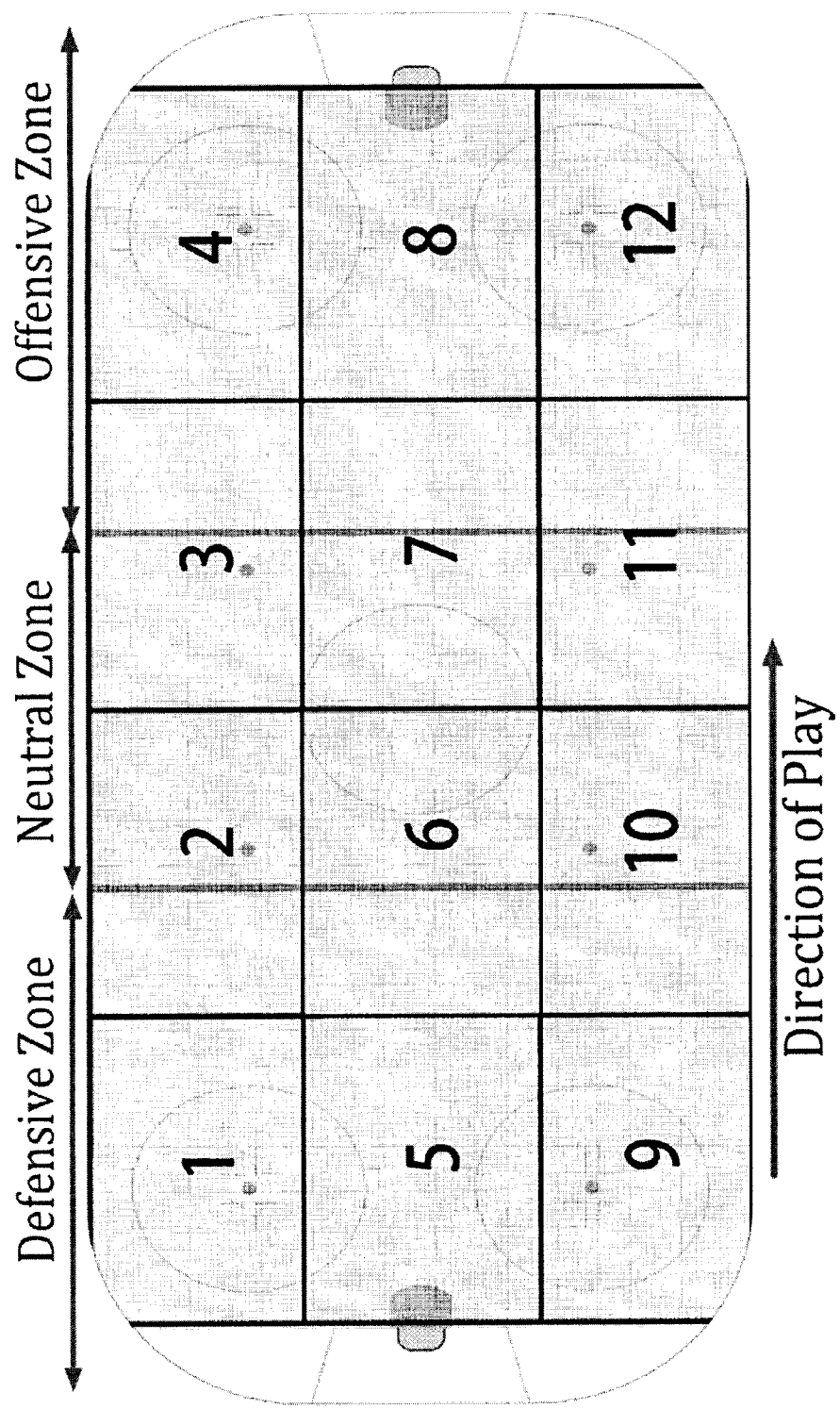
FIG. 4 is a schematic view of an ice rink divided into twelve regions for generating player heat maps.

The data used by the system 8 can be generated from videos using computer vision techniques including player tracking and activity recognition. While the principles herein are applicable to any game, the following describes a particular data set used to model a hockey game and hockey players. Table 3 shows the dataset statistics for the 2015-2016 NHL season. The dataset includes play-by-play information of game events and player actions for the entire season. Every event is marked with a continuous time stamp, the x-y location, and the player that carries out the action of the event. The play-by-play event data records 13 general action types. Table 4 shows an example play-by-play dataset. The table utilizes adjusted spatial coordinates where negative numbers refer to the defensive zone of the acting player, positive numbers to his offensive zone. To illustrate, FIG. 4 shows a schematic layout of an ice hockey rink. Adjusted X-coordinates run from −100 to +100, and Y-coordinates from −42.5 at the bottom to 42.5 at the top, and the origin is at the ice center.

TABLE 3

Dataset statistics for 2015-2016 Season

| | |
|---|---|
| Number of Teams | 30 |
| Number of Players | 2,233 |
| Number of Games | 1,140 |
| Number of Events | 3.3M |

TABLE 4

Sample Play-by-Play Data

| gameId | playerId | Period | teamId | xCoord | yCoord | Manpower | Action Type |
|---|---|---|---|---|---|---|---|
| 849 | 402 | 1 | 15 | −9.5 | 1.5 | Even | Lpr |
| 849 | 402 | 1 | 15 | −24.5 | −17 | Even | Carry |
| 849 | 417 | 1 | 16 | −75.5 | −21.5 | Even | Check |
| 849 | 402 | 1 | 15 | −79 | −19.5 | Even | Puckprot |
| 849 | 413 | 1 | 16 | −92 | −32.5 | Even | Lpr |
| 849 | 413 | 1 | 16 | −92 | −32.5 | Even | Pass |
| 849 | 389 | 1 | 15 | −70 | 42 | Even | Block |

Location-Based Player Clustering

Hockey is considered to be a fast-paced game where players of all roles act in all parts of the ice hockey rink. The presently described player clustering method is based on each player's distribution of action locations across the rink. To represent the action location pattern of a player, one can divide the rink into a fixed number of regions, as shown in FIG. 4.

This division uses four horizontal and three vertical regions, corresponding to the traditional center, left and right wings. For each player, the region frequency is the total number of actions he or she has performed in a region, divided by the total number of his or her actions. Converting counts to frequencies avoids conflating the level of a player's activity with the location of his actions. One can apply the affinity propagation algorithm [2] to the player frequency vectors to obtain a player clustering. Affinity propagation has been found to produce nine player clusters: four clusters of forwards, four clusters of defensemen, and one cluster of goalies. It is interesting to note that the clustering is an unsupervised process.

FIG. 5A shows the 12-region activity heat map for Player A, and FIG. 5B represents the heat map for the cluster that player belongs to. Similarly, FIG. 6A shows the heat map for a different player, namely Player B, and FIG. 6B depicts the average heat map for that player's cluster. The average heat map represents the average frequency of the game events which are happening in that region, over all players in the cluster. The heat maps show that Player B and other players in his cluster tend to play a defensive role on the left wing, whereas Player A and other players in his cluster play a more offensive role, mostly on the right wing.

Figure 7:
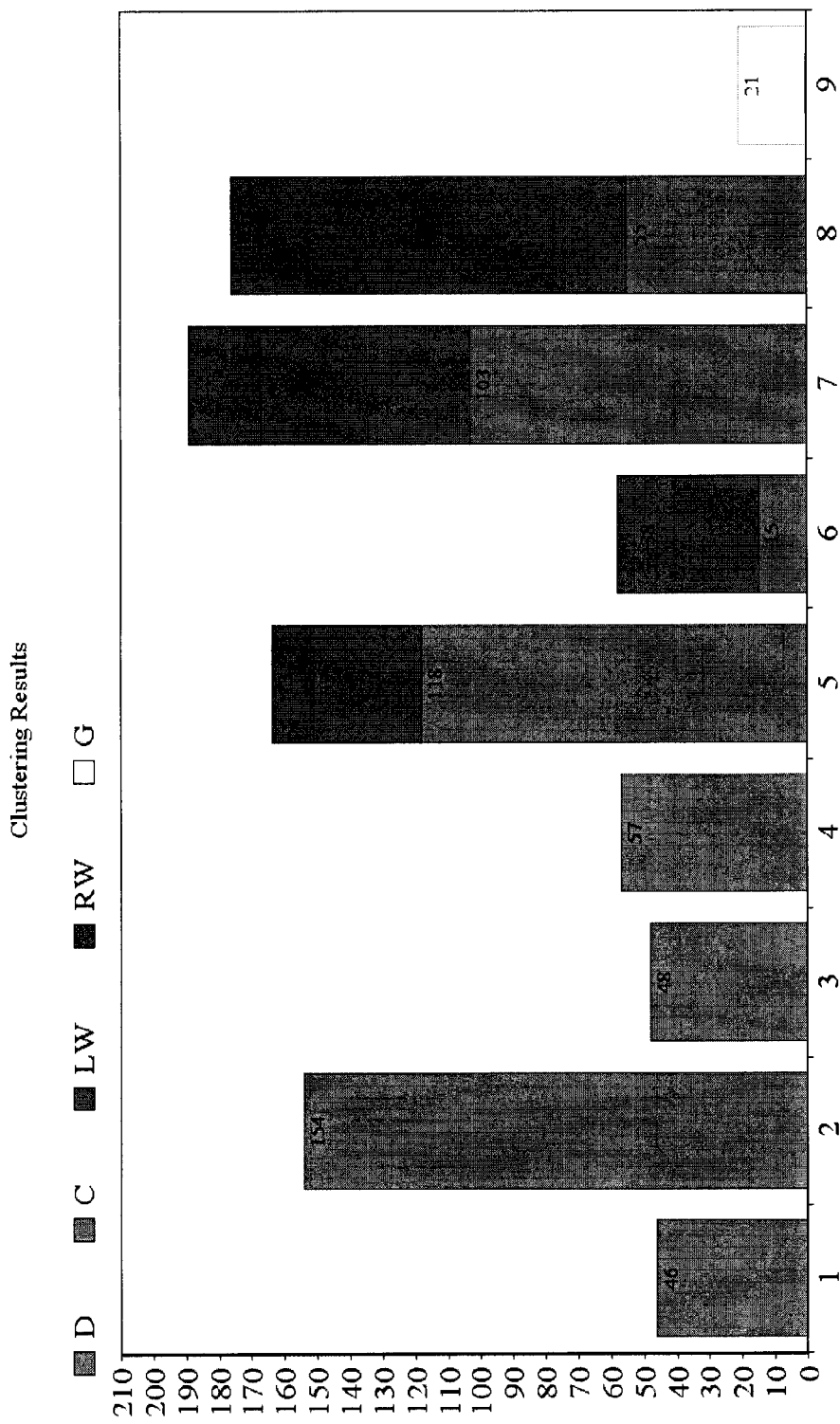
FIG. 7 is a chart illustrating learned clusters matched to player categories.

It is important to compare the learned clusters with the known player types. FIG. 7 shows that the clusters match the basic grouping into defensive players and forwards. The algorithm discovers this grouping only from the game event location information without being given any prior or explicit information about the player's official position. Forwards are commonly divided into centers, left wing players and right wing players. The learned forward clusters match this division to some extent. For instance, clusters 5 and 7 contain mainly but not only centers, cluster 6 contains mainly but not only left-wingers, and cluster 8 contains mainly but not only right-wingers. This indicates not only that the clusters match the conventional player positions, but also that they provide information beyond those predefined positions.

As such, player clustering can be performed using the affinity propagation algorithm. To simplify the computations for clustering, one can discretize the continuous time and location spaces, such as dividing the rink into an arbitrary chosen number of regions, and count the number of specific actions taken place from each region or the amount of time a payer is present in a given location and normalize those counted values.

Applying a clustering algorithm to the location information of where players are taking their actions results in clusters of players who are have tendencies in playing in similar locations and/or taking similar actions during the games. In this exemplary embodiment, applying the affinity propagation algorithm resulted in nine player clusters which are consistent with the conventional player roles in the ice-hockey as illustrated in FIG. 7.

Once the clusters are formed, a high-resolution large-scale Markov game model quantifies the impact of all events on scoring the next goal. The aggregate impact of an action provides a principled effective way to assess player performance. Breaking down the aggregate impact allows the analyst to pinpoint the exact situations in which a player's decisions tends to deviate-positively or negatively-from comparable players. Statistical modelling could further enhance drill-down analysis by identifying which features of the game context and of a player's actions predict a high added-impact.

The impact of an action is defined as the extent to which the action changes the conditional value of the acting player's team at a state. The scoring impact metric for a player is defined as their total impact over all player's actions.

The players' scoring impact metric shows a strong correlation with other important metrics, such as points, time on ice, and salary. This correlation increases by computing the metric for comparable players rather than all players.

The following Table 5 shows the correlation between SI and time on ice (per game). For example, the correlation between SI and time on ice is 0.83 overall, and increases to 0.89 and 0.92 for the clusters shown in the table. The SI is also temporally consistent, i.e., a player's SI metric in the first half of the season correlates strongly with his SI metric in the second half ($\rho=0.77$).

TABLE 5

Correlation Between Scoring Impact and Time on Ice

| | | | | Cluster # | | | | | |
|---|---|---|---|---|---|---|---|---|---|
| | All | 1 | 2 | 3 | 4 | 5 | 6 | 7 | 8 |
| Correlation Coefficient | 0.83 | 0.89 | 0.89 | 0.92 | 0.89 | 0.92 | 0.82 | 0.92 | 0.90 |

The player's ranking can be explained by how he performs in specific game context. This breakdown makes the ranking interpretable because it explains the specific observations that led to the rating and pinpoints where a player's effectiveness deviates from comparable players. The basis of the approach is to find the game contexts in which a player's expected impact differs the most from a random player in his cluster. This metric is referred to herein as the player's added impact. This analysis looks for game contexts where the player shows an unusually high or low added impact.

Markov Game Model

As indicated above, a Markov model is a dynamic model that represents how a hockey game moves from one game state to the next. A sequence of state transitions constitutes a trajectory. The parameters of a (homogeneous) Markov chain are transition probabilities P(s'|s) where s is the current state and s' the next state. Previous Markov chain models for ice hockey have included goal differential and/or manpower differential in the state space. Then the transition probabilities represent how goal scoring and penalty drawing rates depend on the current goal and manpower differentials. This approach can measure the impact of those actions that directly affect the state variables, i.e., goals and penalties. Markov decision processes and Markov game models include both states and actions, which allows us to measure the impact of all actions. The parameters of the presently described Markov game model are state-action transition probabilities of the form P(s',a'|s,a) where a is the current action and a' is the next action. The model therefore describes state-action trajectories as illustrated in FIG. 9.

The Markov model represents the probability that a given action occurs at a given location on the rink. To model the action occurrence probability, one can discretize the rink space into a discrete set of regions. One option for generating discrete regions is to use a fixed grid, such as the one shown in FIG. 4. However, the problem with a fixed grid is that different types of actions tend to be distributed in different locations. For example, shots are found to rarely occur in the defensive zone, whereas blocked shots often do. Therefore, using the same grid for shots and blocks is neither statistically nor computationally efficient. Instead, the system 8 has been used to learn from the data a separate discretization tailored to each action, by applying affinity propagation to cluster the locations of occurrences of a given action type. FIG. 8A shows the resulting regions for blocks, and FIG. 8B for receptions. In each figure, the cluster mean is shown with an occurrence label indicating how many actions are happening in each region. The figures also show the impact of the actions on scoring the next goal for each region, averaged over the game contexts. Those numbers are derived from the developed Markov game model Important quantities in the model specify the joint state-action distribution P(s',a'|s,a) that an action a∈A occurs at the game state s, and is followed by game state s∈S and action a. Because the distribution of the next action and its location depends on the most recent action and its location, the action distribution represents spatial and temporal dynamics. For example, the transition probability of 21% in the second row of Table 1 includes the probability that play moves from carry-region 4 to pass-region 2, given the current game context. One can refer to a state-action pair as a game context, so P(s',a'|s,a) models a context transition probability. Decomposing this probability as P(s',a'|s,a)=P(s'|a',s,a)×P(a'|s,a), it can be seen that it combines two quantities of interest:

(1) the state transition probabilities P(s'|a',s,a) that describe how game states evolve given players' actions.

(2) The action distribution P(a'|s,a) that describes how a random player acts in a given game context.

One can estimate the action-state distribution using the observed occurrence counts n(s',a',s,a), which record how often action a' and state s' follows state s and action a in the dataset. For simplicity, one use n also for marginal occurrence counts, for example $n(s,a)=\Sigma_{s',a}n(s',a',s,a)$. The maximum likelihood estimates can be computed as follows:

$$\hat{P}(s', a' \mid s, a) = \frac{n(s', a', a, s)}{n(s, a)}$$

Action Values and Scoring Impact

In the presently described model 10, the agents are a generic home team and a generic away team, not individual players, similar to previous game models for hockey. This is appropriate for the goal of assigning generic values to all action events. Herein, the Markov model has been used to quantify how a player's action, given a game context, affects the probability that his or her team scores the next goal. A similar approach can be followed to quantify the impact of actions on other outcomes of interest, such as winning the game and penalties. A key feature of a Markov model is that it quantifies not only the immediate but also the medium-term impact of an action.

For T=home or away, let P(T scores next|s,a) denote the probability derived from the model, that after action a, the team T scores the next goal, before the opposing team $\bar{T}$. For a point in a game, it is possible that a play sequence ends with neither team scoring. Therefore another quantity of interest is the conditional probability that a team scores given that one of the two teams scores next. This can be referred to as the conditional value of a game context for team T:

$$CV_T(s, a) = \frac{P(T \text{ scores next} \mid s, a)}{P(T \text{ scores next} \mid s, a) + P(\bar{T} \text{ scores next} \mid s, a)}$$

The conditional value is an appropriate quantity for evaluating actions since the goal of an action is to improve a team's position relative to their opponent. The impact of an action is defined as the extent to which the action changes the conditional value of the acting player's team at a state.

Figure 8B:
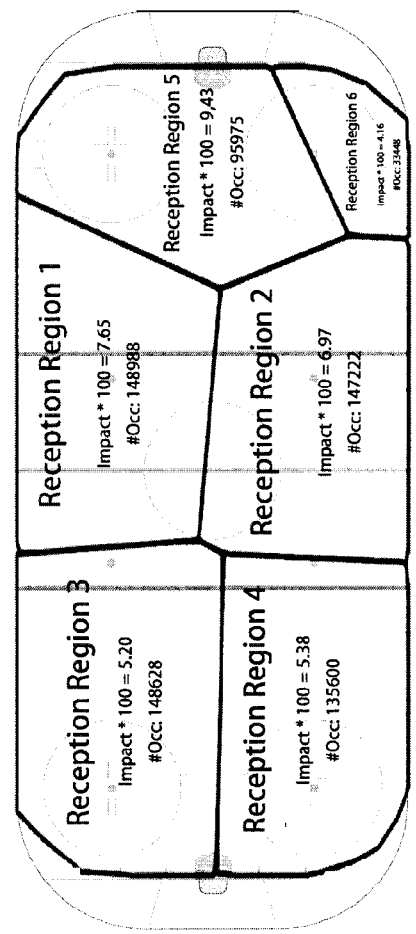
FIG. 8B is an overlay of an ice rink showing learned regions for "reception" events.

FIG. 8A shows the impact of a "Block" by region, averaged over game contexts, and in FIG. 8B, "Receptions". The scoring impact metric for a player is defined as their total impact over all their actions and formulated as follows:

$$\text{Impact}(a'; s, a) = \sum_{s'} CV_T(s', a') \times P(s' \mid a', s, a) - CV_T(s, a)$$

$$SI_i = \sum_{a', s, a} n_i(a', s, a) \times \text{Impact}(a'; s, a) =$$

$$\sum_{s, a} n_i(s, a) \times \sum_{a'} \text{Impact}(a'; s, a) \times P_i(a' \mid s, a)$$

$$\text{where } P_i(a' \mid s, a) = \frac{n_i(a', s, a)}{n_i(s, a)}$$

is the action distribution for player i. The occurrence counts $n_i(a',s',s,a)$ record how many times the game reaches the state s' and player i takes action a' after state s and a player (not necessarily i) took action a. The second expression for the scoring impact shows that the SI metric can be interpreted as the expected impact of a player given a game context (s,a), weighted by how often the player reaches the context.

The SI metric shows a strong correlation with other important metrics, such as points, time on ice, and salary. This correlation increases by computing the metric for comparable players rather than all players. Table 4 (discussed above) shows the correlation between SI and time on ice (per game). For example, the correlation between SI and time on ice is 0.83 overall, and increases to 0.89 and 0.92 for the clusters shown in the table. The SI is also temporally consistent [18], i.e., a player's SI metric in the first half of the season correlates strongly with his SI metric in the second half ($\rho$=0.77).

Given the strong correlation of the scoring impact (SI) metric to the game outcome, one can combine the scoring impacts (SIs) of all the players on one team and compare to another team to determine the expected outcome of the game, and predict the winning team. It can be appreciated that different methods of aggregation can be applied to either the SI or action values to predict the outcome of a game.

For the example clusters used herein, one can also discuss the top-ranked player and some undervalued players.

Drill-Down Analysis

Figure 10A:
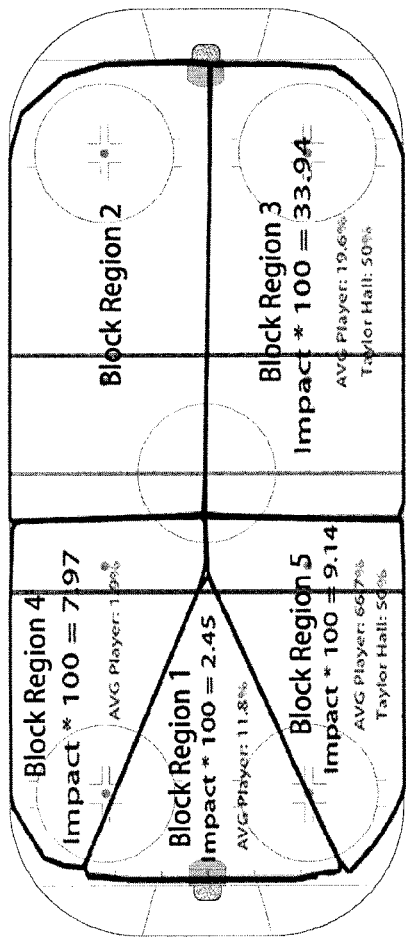
FIG. 10A is an overlay of an ice rink with a drill-down analysis for Player A.

The following breakdown makes the ranking interpretable because it explains the specific observations that led to the rating and pinpoints where a player's effectiveness deviates from comparable players. The basic approach is to find the game contexts in which a player's expected impact differs the most from a random player in his cluster. Referring to this metric as the player's added impact, $\Delta_i(s,a)$, computed as follows:

$$E_j(s, a) = \sum_{a'} \text{Impact}(a'; s, a) \times P_j(a' \mid s, a)$$

$$\Delta_i(s, a) = E_i(s, a) - \sum_{j \in C} \frac{n_j(s, a)}{n_c(s, a)} E_j(s, a)$$

where C is the cluster of player i and $n_C(s,a) = \sum_{j \in C} n_j(s,a)$. Drill-down analysis looks for game contexts where the player shows an unusually high or low added impact. For Player A, his highest added impact is in the first period, with even score and manpower, after his team has managed a reception in region 1. Among action types, the highest added impact stems from Block. FIG. 10A compares Player A's region distribution for Blocks with those of a random player from his cluster. In the specified game context, a Block has the most scoring impact in the right-wing offensive region 3. For this game context, 50% of Player A's Blocks occur in this high-impact region, compared to only 19.6% of Blocks for a random player from his cluster.

Figure 10B:
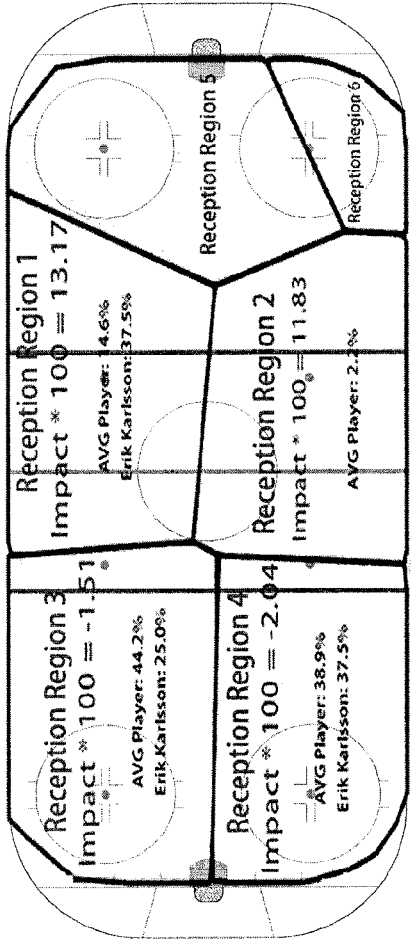
FIG. 10B is an overlay of an ice rink with a drill-down analysis for Player B.

For Player B, the highest added impact is in the third period, with even score and manpower, after his team has managed a pass in region 4. FIG. 10B compares Player B's region distribution for Receptions with those of a random player from his cluster. In the specified game context, a Reception has the most scoring impact in the left-wing offensive region 1. For this game context, 37.5% of Player B's Receptions occur in this high-impact region, compared to only 14.6% of Receptions for a random player from his cluster.

SUMMARY

The systems and methods described herein propose a pure data-driven approach based on clustering and Markov decision process to support the way that scouts and managers evaluate players. Location information of the game events and player actions can be used to identify players with similar styles and roles and rank them based on their impact on scoring the next goal. This work supports "apples-to-apples" comparisons of similar players. Once the clusters are formed, a high-resolution large-scale Markov game model quantifies the impact of all events on scoring the next goal. The aggregate impact of an action provides a principled effective way to assess player performance. Breaking down the aggregate impact allows the analyst to pinpoint the exact situations in which a player's decisions tends to deviate-positively or negatively-from comparable players. Statistical modelling could further enhance drill-down analysis by identifying which features of the game context and of a player's actions predict a high added-impact.

Numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles. The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the system 8, any component of or related to the system 8, etc., or accessible or connectable thereto. Any application or module herein described may be implemented using computer readable/executable instructions that may be stored or otherwise held by such computer readable media.

REFERENCES

[2] Brian Macdonald: An Improved Adjusted Plus-Minus Statistic for NHL Players. 2011. URL http://www.sloansportsconference.com/wp-content/uploads/2011/08/An-Improved-Adjusted-Plus-Minus-Statistic-for-NHL-Players.pdf.
[3] Dan Cervone, Alexander DAmour, Luke Bornn, Kirk Goldsberry: "POINTWISE: Predicting points and valuing decisions in real time with NBA optical tracking data", 8th Annual MIT Sloan Sports Analytics Conference, February, 2014.
[7] R. B. Gramacy, S. T. Jensen, M. Taddy: "Estimating player contribution in hockey with regularized logistic regression.", Journal of Quantitative Analysis in Sports, pp. 97-111, 2013.
[14] Michael L Littman: "Markov games as a framework for multi-agent reinforcement learning", Proceedings of the eleventh international conference on machine learning, pp. 157-163, 1994.
[15] D. Lock, M. Schuckers: Beyond+/−: A rating system to compare NHL players. 2009. Presentation at joint statistical meetings.
[16] Michael Schuckers, James Curro: "Total Hockey Rating (THoR): A comprehensive statistical rating of National Hockey League forwards and defensemen based upon all on-ice events", 7th Annual MIT Sloan Sports Analytics Conference, 2013.
[18] Stephen Pettigrew: "Assessing the offensive productivity of NHL players using in-game win probabilities", 9th Annual MIT Sloan Sports Analytics Conference, 2015.
[19] Richard S. Sutton, Andrew G. Barto: Reinforcement learning: an introduction. MIT Press, 1998.
[20] Robert P. Schumaker, Osama K. Solieman, Hsinchun Chen: Research in Sports Statistics in Sports Data Mining. Springer US, 2010. URL http://dx.doi.org/10.1007/978-1-4419-6730-5_4.
[21] Routley, K. & Schulte, O. (2015), A Markov Game Model for Valuing Player Actions in Ice Hockey, in Uncertainty in Artificial Intelligence (UAI), pp. 782-791.
[22] Nathan Spagnola: The Complete Plus-Minus: A Case Study of The Columbus Blue Jackets. 2013.
[23] Stuart Russell, Peter Norvig: Artificial Intelligence: A Modern Approach. Prentice Hall, 2010.
[24] A. C. Thomas, S. L. Ventura, S. Jensen, S. Ma: "Competing Process Hazard Function Models for Player Ratings in Ice Hockey", The Annals of Applied Statistics, pp. 1497-1524, 2013.
[25] Frey, B. J. & Dueck, D. (2007), 'Clustering by passing messages' Frey, B. J. & Dueck, D. (2007), Science 315(5814), 972-976.

The invention claimed is:
1. A method computer-implemented for evaluating team games, the method comprising:
obtaining data associated with a team game, the data comprising at least one individual player or team activity, a game context, and at least one game event, the data further comprising a location in space for each event and activity and a time that each event and activity happens, wherein the game context comprises a game state space defined by selected features that are relevant for game dynamics of the corresponding type of team game, wherein the game state evolves based on the events and activities of the players;
generating quantitative values for the data associated with the team game using the events and activities, the game context, and corresponding location data by assessing impacts of the events and activities in the game context;
evaluating either or both an individual player and a team using the quantitative values; and
generating a quantitative data output associated with the evaluating.
2. The method of claim 1, further comprising using a Markov Model to assign the quantitative values to activities and game events at the associated location and time.
3. The method of claim 1, further comprising determining a look ahead that indicates how future events affect a current state and action values.
4. The method of claim 1, wherein generating a quantitative data output comprises outputting at least one of: an effect of a player or team activity in the game, a player contribution to a future game, or a player or team efficiency in achieving a particular outcome.
5. The method of claim 1, further comprising performing a player clustering or grouping based on that player's impact on a game, that player's playing style, or both.
6. The method of claim 1, wherein generating a quantitative data output comprises generating at least one quantitative metric to rank players and assess player performance in games.
7. The method of claim 1, wherein generating a quantitative data output comprises generating at least one quantitative metric to rank a team and assess team performance in games.
8. The method of claim 1, wherein generating a quantitative data output comprises generating at least one quantitative metric to evaluate team strategies in a game.
9. The method of claim 1, wherein generating a quantitative data output comprises generating at least one quantitative metric to predict player performance and game outcomes.
10. The method of claim 1, further comprising grouping players in a game based on a respective playing style, which comprises:
automatically generating a plurality of clusters of one or more players based on a presence and/or activities associated with each player.
11. The method of claim 10, wherein each cluster is automatically generated by:
obtaining information about a player's presence;
generating presence maps for the players;
grouping presence maps based on similarity in spatial and/or temporal characteristics; and
forming the clusters.
12. The method of claim 10, further comprising using the location of the players in a game.

13. The method of claim 10, wherein the data associated with the team game further comprises a location in space and time for each of the events and activities.

14. The method of claim 10, further comprising using the location of the players in a game to identify their playing style.

15. The method of claim 10, further comprising generating at least one quantitative metric to rank players and assess player performance in games within a group of players with the similar playing style.

16. The method of claim 10, further comprising generating player rankings and comparisons to suggest similar players to replace a particular player.

17. The method of claim 16, further comprising automatically identifying the game context wherein a player shows an unusually high or low added impact compared to similar players.

18. A non-transitory computer readable medium comprising computer executable instructions for evaluating a team game, comprising instructions for:
   obtaining data associated with a team game, the data comprising at least one individual player or team activity, a game context, and at least one game event, the data further comprising a location in space for each event and activity and a time that each event and activity happens, wherein the game context comprises a game state space defined by selected features that are relevant for game dynamics of the corresponding type of team game, wherein the game state evolves based on the events and activities of the players;
   generating quantitative values for the data associated with the team game using the events and activities, the game context, and corresponding location data by assessing impacts of the events and activities in the game context;
   evaluating either or both an individual player and a team using the quantitative values; and
   generating a quantitative data output associated with the evaluating.

19. An electronic device comprising a processor and memory, the memory comprising computer executable instructions for evaluating a team game, comprising instructions for:
   obtaining data associated with a team game, the data comprising at least one individual player or team activity, a game context, and at least one game event, the data further comprising a location in space for each event and activity and a time that each event and activity happens, wherein the game context comprises a game state space defined by selected features that are relevant for game dynamics of the corresponding type of team game, wherein the game state evolves based on the events and activities of the players;
   generating quantitative values for the data associated with the team game using the events and activities, the game context, and corresponding location data by assessing impacts of the events and activities in the game context;
   evaluating either or both an individual player and a team using the quantitative values; and
   generating a quantitative data output associated with the evaluating.

20. The non-transitory computer readable medium according to claim 18 further comprising computer executable instructions for grouping players in a game based on a respective playing style, comprising instructions for:
   automatically generating a plurality of clusters of one or more players based on a presence and/or activities associated with each player.

21. The electronic device according to claim 19, the memory further comprising computer executable instructions for grouping players in a game based on a respective playing style, comprising instructions for:
   automatically generating a plurality of clusters of one or more players based on a presence and/or activities associated with each player.

* * * * *